(12) United States Patent
Cooper et al.

(10) Patent No.: US 10,847,271 B1
(45) Date of Patent: Nov. 24, 2020

(54) MN-DOPED OXIDE NUCLEAR FUEL

(71) Applicant: Los Alamos National Security, LLC, Los Alamos, NM (US)

(72) Inventors: Michael William Donald Cooper, Los Alamos, NM (US); Anders David Ragnar Andersson, Los Alamos, NM (US); Christopher Richard Stanek, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 28 days.

(21) Appl. No.: 16/101,808

(22) Filed: Aug. 13, 2018

Related U.S. Application Data (60) Provisional application No. 62/544,673, filed on Aug. 11, 2017.

(51) Int. Cl.
*G21C 3/62* (2006.01)
*G21C 3/60* (2006.01)
*C04B 35/51* (2006.01)
*C04B 35/64* (2006.01)
*C04B 111/00* (2006.01)

(52) U.S. Cl.
CPC ............ *G21C 3/623* (2013.01); *G21C 3/60* (2013.01); *C04B 35/51* (2013.01); *C04B 35/64* (2013.01); *C04B 2111/00862* (2013.01); *C04B 2235/40* (2013.01)

(58) Field of Classification Search
CPC . G21C 3/623; G21C 3/60; C04B 2111/00862; C04B 35/51; C04B 35/64; C04B 2235/40
See application file for complete search history.

(56) References Cited

U.S. PATENT DOCUMENTS 4,460,522 A * 7/1984 Kinugasa .............. G21C 3/623
252/637
8,989,340 B2 3/2015 Kang et al.
(Continued)

OTHER PUBLICATIONS

Arborelius, Jakob, et al., "Advanced Doped UO$_2$ Pellets in LWR Applications", Journal of Nuclear Science and Technology, vol. 43, No. 9, pp. 967-976, 2006.

(Continued)

*Primary Examiner* — Andrew J. Oyer
(74) *Attorney, Agent, or Firm* — Lewis Roca Rothgerber Christie LLP (57) ABSTRACT

A nuclear fuel includes uranium(IV) oxide (UO$_2$) and manganese (Mn) as a dopant. The Mn dopant may be present in the fuel in an amount up to the solubility limit for Mn under a given set of conditions, for example, about 0.01 wt % to about 1 wt %. The nuclear fuel is substantially free of aluminum (Al). The nuclear fuel exhibits enhanced grain size development during sintering temperatures as low at 1400 K due to an increase in uranium sub-lattice vacancies induced by dissolution of the Mn dopant at interstitial defect sites. The Mn-doped nuclear fuel exhibits improved grain sizes at lower temperatures compared to Cr-, Al-, and undoped UO$_2$, and therefore desirably exhibits lower fission gas release and higher plasticity, reducing the chances of fuel rod failure.

20 Claims, 7 Drawing Sheets

(56) References Cited

U.S. PATENT DOCUMENTS

2002/0009645 A1* 1/2002 Shima ............... C01G 45/1242
429/224
2012/0228788 A1* 9/2012 Jankowiak ............ G21C 19/46
264/0.5

OTHER PUBLICATIONS

Bourgeois, L., et al., "Factors Governing Microstructure Development of $Cr_2O_3$-doped $UO_2$ During Sintering", Journal of Nuclear Materials, vol. 297, pp. 313-326, 2001.

Cooper, M.D., et al., "The role of Dopant Charge State on Defect Chemistry and Gain Growth of Doped $UO_2$", Acta Materials, vol. 150, pp. 403-413, 2018.

Jung, In-Ho, et al., "Thermodynamic Evaluation and Optimization of the $MnO$—$Al_2O_3$—$SiO_2$ Systems and Applications to Inclusion Engineering", Metallurgical and Materials Transactions B, vol. 35B, pp. 259-268, 2004.

Riglet-Martial, Ch., "Thermodynamics of Chromium in $UO_2$ Fuel: A Solubility Model", Journal of Nuclear Materials, vol. 447, pp. 63-71, 2014.

\* cited by examiner

MN-DOPED OXIDE NUCLEAR FUEL

CROSS-REFERENCE TO RELATED APPLICATION

This application claims priority to and the benefit of U.S. Provisional Application No. 62/544,673, filed Aug. 11, 2017 and titled "MN-DOPED OXIDE NUCLEAR FUEL", the entire content of which is incorporated herein by reference.

STATEMENT REGARDING FEDERALLY SPONSORED RESEARCH OR DEVELOPMENT

The United States government has certain rights in this invention pursuant to Contract No. DE-AC52-06NA25396 between the United States Department of Energy and Los Alamos National Security, LLC for the operation of Los Alamos National Laboratory.

BACKGROUND

Uranium dioxide ($UO_2$) pellets are the predominant form of fuel for conventional reactors as well as many advanced nuclear reactors. The microstructure of these $UO_2$ pellets affects fuel performance in several important ways. For example, large crystal grains desirably increase pellet plasticity (e.g., through the Hall-Petch effect) and fission product retention.

Dopants including chromium (Cr) and aluminum (Al) have been added to pre-sintered $UO_2$ powder in an effort to produce larger grains during sintering. It has been frequently suggested that enhanced sintering (e.g., resulting in larger grain sizes or faster densification) of such doped fuels is dependent on the formation of a liquid secondary oxide phase eutectic. However, contrary to this suggestion, enhanced sintering has been observed at or below the solubility limit for these dopants. As the mechanism of increased grain size production is not fully understood, further development of doped $UO_2$ fuels has been limited.

SUMMARY

According to one or more embodiments of the present disclosure, a nuclear fuel includes uranium(IV) oxide ($UO_2$) and manganese (Mn). The Mn may be present in an amount of about 0.01 wt % to about 1 wt % (100 ppm to about 10000 ppm) based on the total weight of the nuclear fuel; and the nuclear fuel is substantially free of aluminum (Al).

In some embodiments, the nuclear fuel is configured to not form a liquid (eutectic) phase during sintering.

In some embodiments, the Mn is derived from a manganese salt having one or more counter anions. The one or more counter anions may each be an oxide anion, a nitride anion, a stearate anion, a chloride anion, or a hydroxide anion. In some embodiments, the Mn is derived from a manganese oxide. In some embodiments, the manganese oxide is $Mn_2O_3$.

In some embodiments, the Mn is present in an amount of about 0.1 wt % to about 0.5 wt % (1000 ppm to about 5000 ppm) based on the total weight of the nuclear fuel.

In some embodiments, the Mn has an interstitial concentration of about 0.001 to about 0.05 fractional defects per unit of $UO_2$ at a sintering temperature above about 1430 K. In some embodiments, the Mn has an interstitial concentration of about 0.01 to about 0.1 fractional defects per unit of $UO_2$ at a sintering temperature above about 1700 K.

In some embodiments, the nuclear fuel has a grain size enhancement factor over undoped $UO_2$ of about 1.1 to about 35 times after sintering at about 1700 K to about 3200 K (for example, up to the $UO_2$ melting point). In some embodiments, the nuclear fuel has a grain size enhancement factor over undoped $UO_2$ of about 1.3 to about 14 times after sintering at about 1770 K to about 2000 K.

In some embodiments, the nuclear fuel further comprises active nuclides (actinides) other than uranium. In some embodiments, the active nuclides (actinides) other than uranium comprise thorium (Th), plutonium (Pu), or a mixture thereof.

According to one or more embodiments of the present disclosure, a method of manufacturing a nuclear fuel pellet includes: mixing uranium(IV) oxide ($UO_2$) and a manganese (Mn) dopant in the absence of added aluminum (Al) to yield a fuel composition that is substantially free of aluminum; pressing the fuel composition into a pellet; and sintering the pellet.

In some embodiments, the Mn dopant is derived from a manganese salt having one or more counter anions, the one or more counter anions each comprising an oxide anion, a nitride anion, a stearate anion, a chloride anion, or a hydroxide anion. In some embodiments, the Mn dopant is derived from a manganese oxide. In some embodiments, the manganese oxide is $Mn_2O_3$.

In some embodiments, the Mn dopant is present in the fuel composition in an amount of about 0.01 wt % to about 1 wt % based on the total weight of the fuel composition.

In some embodiments, sintering the pellet is carried out at a temperature of about 1430 K to about 3200 K. In some embodiments, the nuclear fuel pellet is carried out at a temperature of about 1700 K to about 2000 K.

BRIEF DESCRIPTION OF THE DRAWINGS

These and other features and advantages of the present invention will be better understood by reference to the following detailed description when considered in conjunction with the accompanying drawings, in which.

DETAILED DESCRIPTION

Throughout this disclosure, when a process or reaction is described as being represented by, approximated by, generally similar to, and/or substantially similar to a specific chemical equation or equilibrium, the equation and/or equilibrium is presented only to illustrate example embodiments of the present disclosure, and is not meant to limit the embodiment to any particular mechanism or theory, or otherwise limit the scope of embodiments of the present disclosure. For example, the process or reaction may be suitably described by another equation or equilibrium different from that presented herein. Furthermore, the equation or equilibrium may not necessarily provide a full description of the chemistry and stoichiometry involved therein, and additional reactants, reagents, products, and/or other species that are not described in the equation or equilibrium may be present in the reaction or process.

Aspects of embodiments of the present disclosure are directed to a uranium dioxide ($UO_2$) nuclear fuel including a dopant that includes manganese (Mn), and a method of manufacturing the same. As used herein, the terms "dopant" and "doping agent" are interchangeably used in their art-recognized sense to refer to an atomic and/or elemental trace impurity in a host substance. This impurity is included in the host substance at a very low concentration and is intended to alter the material and/or chemical properties of the host substance. Here, the terms "trace impurity", "very low concentration", and "small fraction" may refer to a stoichiometric or substitution amount of about 100 ppm to about 10000 ppm (e.g., of the dopant material with respect to the host substance), for example, about 200 ppm to about 5000 ppm, 500 ppm to about 2000 ppm, or about 700 ppm to about 1500 ppm. From a structural standpoint, when the substance is a substantially crystalline material, such dopants may be included in the crystal lattice of the structure in a small fraction of unit cells (i.e., a fraction of cells commensurate with the described concentrations, for example, 1 out of 800 fluorite unit cells when the concentration is about 1000 ppm, etc.).

Nuclear fuel dopants are of interest for their potential to improve $UO_2$ fuel performance. For example, dopants may be used to adjust rate- and equilibrium-related performance parameters that depend on the microstructure of $UO_2$ fuel pellets without fundamentally changing the processing requirements of the fuel. It is difficult to introduce new fuel designs to market due to very tight regulations on the nuclear industry. As such, advanced fuel concepts that build upon the well-understood and widely used $UO_2$ system but that exhibit improved performance properties are desired.

The term "microstructure" is used in its art-recognized sense to refer to structural features that are viewable only under an optical microscope at more than about 25× to about 100× magnification. Such structural features may include the habits, shapes, packing, grain sizes, porosity, inclusions, etc. of the smaller (e.g., primary and/or secondary) particles that collectively form the pellet. The term "grain size" refers to the size (e.g., largest dimension or average diameter) of such particle "grains".

The grain size of $UO_2$ fuel pellets affects fuel performance and stability in several ways. For example, larger grain sizes are associated with lower volumes and rates of fission gas release. The term "fission gas" is used herein in its art-recognized sense to refer to gaseous fission products, such as krypton (Kr) and xenon (Xe). Decreases in the volume of released fission gases are desirable, as fission gases can decrease thermal conductivity at the fuel-clad gap and cause fuel rod failure due to mechanical stress associated with high reactor pressures. Molecules of fission gas generated in the interior of a crystal grain must diffuse to the grain boundary in order to be released. As such, the statistical probability and hence the total volume of gas release is decreased in pellets composed of larger particles, because the diffusion path to the grain boundary is longer. In addition, the increased plasticity of fuel pellets having larger grain sizes may beneficially reduce strain at the pellet-cladding interface, further reducing the chances of fuel rod failure.

The grain size of $UO_2$ particles may be selected or modified during sintering. During the sintering process, fuel particles that have been compacted together are subjected to elevated temperatures. The increased thermal energy accelerates the diffusion of atoms toward and across inter-particle boundaries, and the subsequent formation of new bonds across those boundaries fuses the particles together into larger composite grains.

When the material in the particles is a compound including two or more elements, atoms of each of the two or more elements are needed in their stoichiometric proportions to form additional bonds between adjacent particles. Atoms of different elements may exhibit different diffusion rates through the particle and toward the particle boundary for a variety of reasons, including differences in particle size, interactions with other atoms in the material, and the availability of lower-energy diffusion paths (e.g., open space associated with interstitial sites, vacancies, etc.). In $UO_2$, the migration (e.g., diffusion rate) of uranium atoms through the crystal lattice is far slower than the migration (e.g., diffusion rate) of oxygen atoms through that same lattice, as can be predicted in part by their size differential. Therefore, uranium diffusion (transport) is the rate-limiting factor in the alignment and formation of larger $UO_2$ crystal grains during sintering.

One strategy or mechanism for increasing the rate of uranium atom diffusion through the crystal lattice during sintering involves increasing the concentration of uranium vacancies $[V_U]$ (e.g., uranium vacancies) in the crystal lattice of $UO_2$. The vacancies may allow uranium atoms to more easily diffuse through the lattice by hopping through vacant sites. In general, $UO_2$ grain growth rates are proportional to $D_U^{0.5}$, where the diffusivity of uranium ($D_U$) scales proportionally to $[V_U]$. Therefore, an increased number or concentration of vacancies on the uranium sub-lattice (e.g., uranium atom sites in the crystal lattice) enables faster self-diffusion or substitutional lattice diffusion of uranium, and hence faster $UO_2$ grain growth during sintering.

Figure 1:
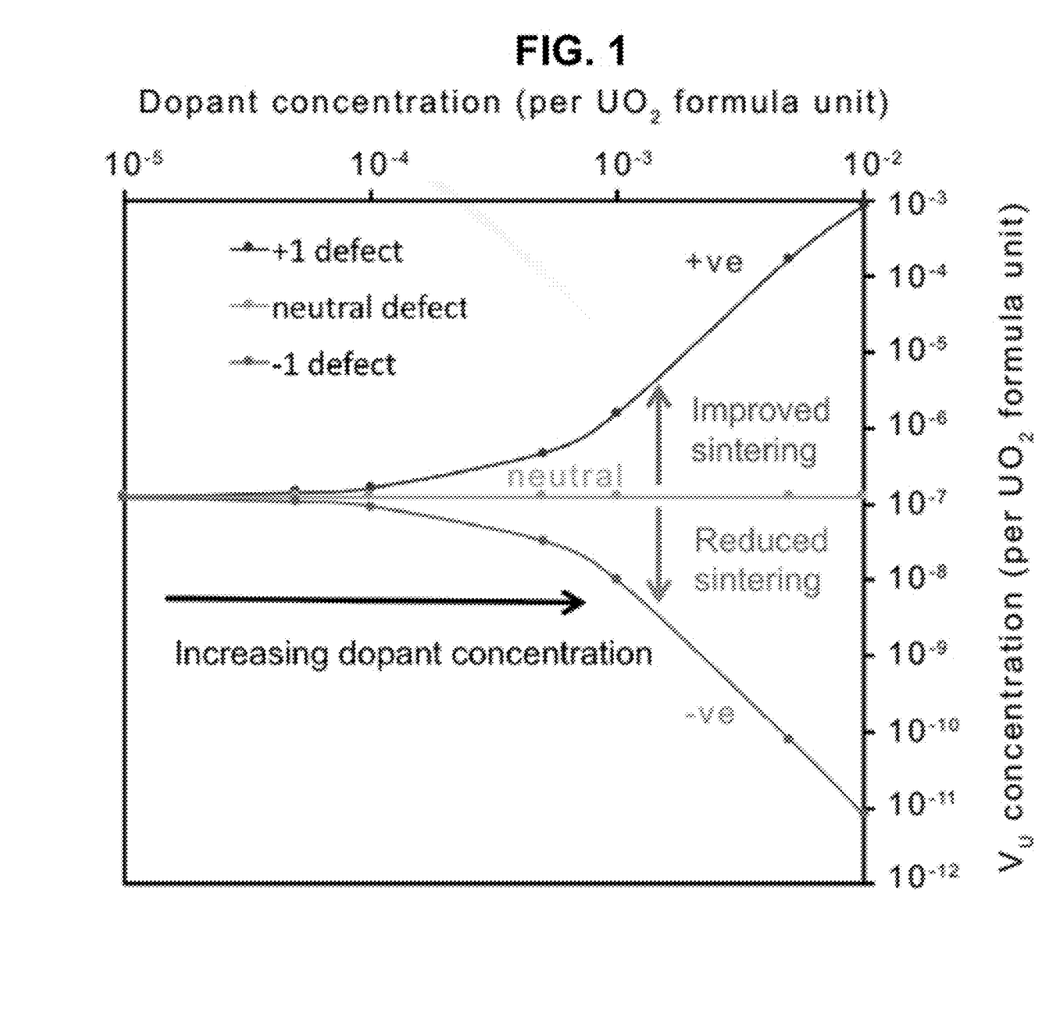
FIG. 1 is a plot showing the relationships between the concentration of defects (as a fraction per $UO_2$ formula unit) and the concentration of uranium vacancies $V_U$ (as a fraction per $UO_2$ formula unit) for dopants of varying charge, as calculated by atomic scale simulations (using density functional theory and empirical potentials).

In some embodiments, the concentration of uranium vacancies can be modified by adding a dopant to the $UO_2$ material. For example, modeling of systems including intrinsic defects shows that +ve (positively charged) dopant defects are associated with an increase in the uranium vacancy concentration $[V_U]$. FIG. 1 is a plot showing the relationships between the concentration of defects (as a fraction per $UO_2$ formula unit) and the concentration of uranium vacancies $V_U$ (as a fraction per $UO_2$ formula unit) for dopants of varying charge. The middle trace corresponds to a neutral dopant (e.g., a dopant that does not change the default charge balance of the material, for example Th(IV) in place of U(IV)). As can be seen from the flat line, a neutral dopant has no effect on $[V_U]$. The lower trace corresponds to a −ve (negatively charged) dopant having a charge of −1 with respect to the ideal U(IV) lattice. As can be seen from this lower trace, a negatively charged dopant decreases $[V_U]$. The upper trace corresponds to a +ve (positively charged) dopant having a charge of +1 with respect to the ideal U(IV) lattice. As can be seen from this upper trace, a positively charged dopant increases $[V_U]$. The effects on $[V_U]$ by the +ve and −ve dopants appear to be described by two linear regimes spanning the ranges of about $10^{-5}$ to about $4 \times 10^{-4}$ formula unit defects and about $4 \times 10^{-4}$ to about $10^{-2}$ formula unit defects, respectively, with higher magnitude effects being predicted for dopant concentrations in the higher range (e.g., $4 \times 10^{-4}$ and higher). Further, a dopant concentration of about $10^{-2}$ per formula unit results in a factor of $10^4$ increase or decrease in $[V_U]$ relative to neutrally doped or undoped $UO_2$. Therefore, FIG. 1 shows that a +ve dopant that induces a net positive charge in the system can be used to increase the concentration of uranium vacancies, thereby increasing the grain size of the material under the conditions used for sintering.

$UO_2$ has a face-centered cubic (FCC) unit cell with a fluorite structure that has multiple octahedral interstitial sites. $UO_2$ can accommodate dopant atoms at these interstitial sites (e.g., as interstitial dopants) and/or on uranium sub-lattice sites (e.g., as substitutional dopants). The effective charge of the dopant (e.g., +ve, −ve, or neutral) depends on the relative charge of the dopant atom with respect to the corresponding site or atom in the ideal structure. For example, because the unoccupied interstitial site in the ideal structure has a neutral charge, any cation should act as a +ve dopant at that site. Meanwhile, because the uranium site in the ideal structure has a charge of +4 (e.g., from U(IV)), a +ve dopant atom at that site would need to have a valence higher than +4. The effective charge of the dopant may be further complicated by atom "jumping" between interstitial and uranium sites when that dopant is compatible with both sites. For example, a +1 valence dopant may act as a +ve dopant at an interstitial site, but act as a −ve dopant at a uranium site. In addition, the effective charge of the dopant may be further affected by oxidizing or reducing external conditions, as determined by, e.g., the temperature and oxygen partial pressure applied to the fuel rods.

The maximum concentration of a dopant in $UO_2$ may depend on several factors, including the charge or valence of the dopant atom, the size of the dopant atom in comparison to the available dopant sites, and the relative stability of the dopant in solution vs. precipitation as an oxide compound. Without being bound by the correctness of any particular theory, the suitability of various elements as dopants may be predicted and/or justified as follows.

First, the ability of the dopant atoms to achieve and maintain a suitable oxidation state (e.g., a +ve dopant state during sintering) should be considered. Chromium (Cr), iron (Fe), and Mn are transition metals having electronic structures in which multiple valence electrons are held in d-orbital shells that are relatively shielded from the nucleus by electrons in lower energy s and p shells, such that those d electrons tend to have lower ionization energies. As a result, these transition metals can easily achieve a range of energetically stable positively charged valence states. This versatility enables transition metal dopants to easily access valence states suitable for solubility at a particular site.

As will be described in more detail below, calculations suggest that dopants that can achieve a +1 valence at an interstitial site under sintering conditions exhibit favorable solubilities. Consequently, although Cr, Fe, and Mn are most stable in the form of Cr(III), Fe(III), and Mn(III) oxides under ambient conditions, these dopant elements can be easily converted to lower valence states (including +1 states) that can be favorably dissolved into the $UO_2$ lattice as interstitial species. In contrast, aluminum ($Al^0$) has a [Ne] $3s^2 3p^1$ electronic structure that does not include any easily removed d electrons, and $Al^{3+}$ is the only stable oxidation state of aluminum. As such, interstitial doping of $UO_2$ with $Al^+$ is highly energetically unfavorable compared to precipitation of an $Al^{3+}$ salt. Further, the apparent preference at the interstitial site for dopants in a low charge state (as predicted by the calculations) reduces the stability (viability) of the $Al^{3+}$ species as an interstitial dopant. Together, this results in much lower concentrations of Al in solid solution and no noticeable effect on the uranium vacancy concentration. The ability of a dopant to readily access low charge states (e.g. 1+) appears to be a prerequisite for significant interstitial formation and enhanced uranium vacancy concentrations.

Second, doping should be more favorable when the radius of the dopant atom is smaller than the radius of the dopant site. U(IV) has an average crystal radius of about 1.05 Å in $UO_2$, and the octahedral interstitial site has an average crystal radius of about 0.92 Å. The first row transition metals tend to have radii that are smaller than both sites. For example, Mn(II) has a radius of about 0.81 Å, and Cr(II) has a radius of about 0.87 Å. Accordingly, substitution at either site is expected to be geometrically allowed for most, if not all possible first row d-block transition metal dopants. Furthermore, even though the M(I) dopants are expected to have larger radii than their corresponding M(II) states, it appears likely that M(I) first row d-block transition metal dopants should also be geometrically allowed. In contrast, dopants such as potassium ($K^+$) are likely to be completely excluded or disfavored given their larger radii of 1.52 Å, respectively.

Third, the stability of the dopant in solid solution may be affected by the relative thermodynamic stability of the precipitated dopant oxide (e.g., the $K_{sp}$ for the dopant oxide compound). For example, as discussed above, $Al^{3+}$ tends to precipitate as the stable oxide $Al_2O_3$ instead of being dissolved in $UO_2$. As another example, although Ni(II) is highly stable and has a radius appropriate for occupying the $UO_2$ interstitial site (e.g., 0.83 Å), Ni(II) also tends to precipitate as $NiO_{(s)}$ instead of being dissolved into $UO_2$. As such, Ni is predicted to be less effective than other first row transition metals as a possible dopant.

According to calculations carried out and described herein, pure Mn has a greater effect on the number of uranium vacancies due to its greater interstitial solubility in $UO_2$ compared to both Al and Cr. Without being bound by any particular theory, it is believed that the smaller crystal radius of Mn(I) compared to Cr(I) (as predicted by the effect of $Z_{eff}$ on radius) is energetically associated with a higher solubility at the interstitial site. The facile redox chemistry of Mn and/or the stability of its reference oxide may further enhance its solubility. Accordingly, when an Mn oxide is included in the pre-sintered fuel powder, enhanced grain growth may be achieved during sintering as a consequence of the higher uranium vacancy concentrations, relative to undoped $UO_2$, Cr-doped $UO_2$, Al-doped $UO_2$, and mixtures thereof.

Figure 2:
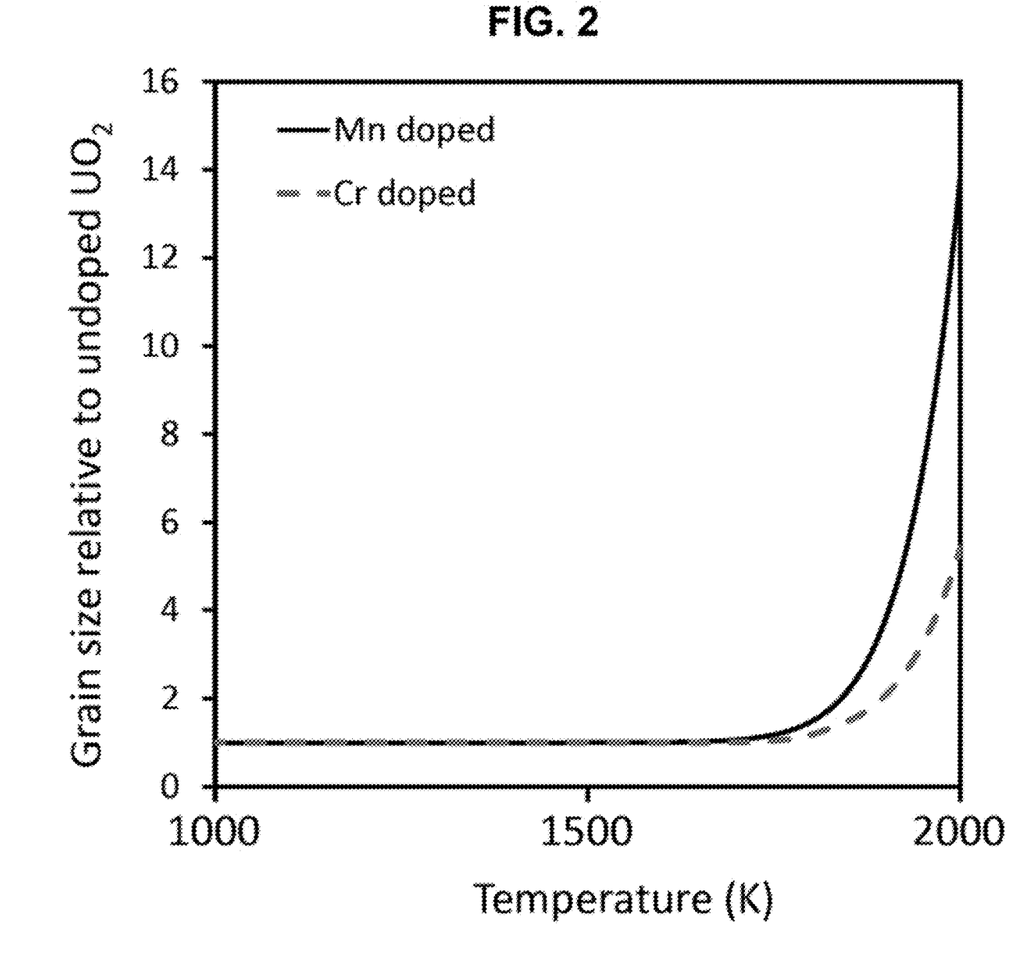
FIG. 2 is a plot comparing the calculated grain sizes of Cr-doped $UO_2$ (dashed trace) and Mn-doped $UO_2$ (solid trace), normalized with respect to the average grain size of undoped $UO_2$ and based on the calculated concentrations of uranium vacancies (i.e., grain size $\propto [V_U]^{0.5}$ for a given temperature).

FIG. 2 is a plot comparing the DFT-calculated grain sizes of Cr-doped $UO_2$ (dashed trace) and Mn-doped $UO_2$ (solid trace), normalized with respect to the average grain size of undoped $UO_2$ and based on the calculated concentrations of uranium vacancies (i.e., grain size $\propto [V_U]^{0.5}$ for a given temperature). The predicted grain sizes may be less accurate above the eutectic temperatures (e.g., about 1840 K for Mn and about 1900 K for Cr) due to uncertainty in the treatment of the reference oxide and the relationship between temperature and dopant solubility within this regime. However, a conservative prediction is that grain size enhancement with respect to the undoped case still occurs to a similar (e.g., equal or greater) extent in compositions above the eutectic temperature as for compositions held just below the eutectic temperature.

In FIG. 2, an increase in temperature (moving right on the y-axis) is expected to generally increase dopant solubility. Indeed, FIG. 2 shows that while Mn and Cr dopants both increase the $UO_2$ grain size with increasingly large multipliers as the temperature increases above about 1700 K, doping with Mn achieves the same effect at about 50-100 degrees lower than with Cr. Alternatively, doping with Mn is predicted to produce grain sizes twice as large compared to doping with Cr at any given temperature above about 1930 K. As such, Mn is predicted to be more effective than Cr at increasing the grain size of $UO_2$ during sintering.

According to one or more embodiments of the present disclosure, a nuclear fuel (e.g., a nuclear fuel pellet) includes $UO_2$ and Mn. The Mn is included in the nuclear fuel as a dopant up to the solubility limit for Mn in $UO_2$ under a given set of conditions (for example, sintering temperature and oxygen partial pressure). In some embodiments, for example, the Mn may be included in an amount of about 0.01 wt % to about 1 wt %, or about 0.1 wt % to about 0.5 wt % based on a total weight of the nuclear fuel. The nuclear fuel (e.g., the fuel pellet) is substantially free of aluminum (Al) (e.g., does not include Al).

As discussed herein, the solubility of Al in $UO_2$ is limited. As such, the addition of aluminum in the form of, for example, an $Al_2O_3$ salt, is more likely to result in retention of the $Al_2O_3$ salt as a precipitate (e.g., inclusion bodies) rather than dissolution of Al in the fuel. Such precipitates may actually cause unfavorable limiting of grain sizes in the fuel pellet via grain boundary pinning, which occurs when precipitates form physical barriers that prevent or limit fusion between adjacent particles of $UO_2$. Accordingly, the nuclear fuels and/or fuel pellets according to embodiments of the present disclosure are selected to be substantially or completely free of Al. As used herein, the term "substantially" is used as a term of approximation, and not as a term of degree, and is intended to account for the difficulty in measuring, observing or calculating exact values for certain parameters. For example, in this context, the term "substantially free of Al" denotes that if the fuels and/or pellets contain any Al, the Al is present only in trace amounts that do not contribute to the chemical or physical performance of the fuels and/or pellets, and/or have a negligible effect on the properties and performance characteristics of the fuels and/or pellets. In contrast, the term "completely free of Al" denotes that the fuel or pellet contains no measurable amount of Al. Furthermore, the nuclear fuel and/or pellet does not form an Mn—Al eutectic. In some embodiments, the nuclear fuels and/or fuel pellets according to embodiments of the present disclosure are selected to be substantially or completely free of Cr, where "substantially free of Cr" and "completely free of Cr" are defined in parallel with respect to the above "substantially free of Al" and "completely free of Al" terms.

In some embodiments, a nuclear fuel and/or fuel pellet includes uranium dioxide ($UO_2$) and a dopant including (or comprising), consisting essentially of, or consisting of a manganese (Mn)-containing compound. As used herein, a dopant "consisting of" Mn includes Mn (as the specifically added dopant) and impurities normally encountered after manufacture and/or during the use of the nuclear fuel and/or fuel rod. Also, a dopant that "consists essentially of" Mn includes Mn (as the specifically added dopant) and any other components that do not affect the properties or functions of the $UO_2$ or Mn components, or the processes or functions of the fuel and/or fuel rod. For example, in some embodiments, a dopant "consisting essentially of" Mn includes Mn as the specifically added dopant, and not include other dopant materials, such as Cr and/or Al. As used herein, the term "specifically added" refers to a dopant material or component that is deliberately added to the dopant composition. The Mn is included as a dopant up to the solubility limit of the Mn compound in $UO_2$, for example, in amount of at least about 0.01 wt % (100 ppm) to about 1 wt % (10000 ppm) in $UO_2$. In some embodiments, for example, the Mn is included in an amount of about 0.01 wt % to about 1 wt % or about 0.1 wt % to about 0.5 wt % based on a total weight of the nuclear fuel.

In some embodiments, a nuclear fuel and/or fuel pellet includes (comprises), consists essentially of, or consists of uranium dioxide ($UO_2$) and a manganese (Mn)-containing compound. As used herein, a nuclear fuel and/or fuel rod that "consists of" $UO_2$ and Mn includes the components $UO_2$, Mn, and impurities normally encountered after manufacture and/or during the use of the nuclear fuel and/or fuel rod. Also, a nuclear fuel and/or fuel rod that "consists essentially of" $UO_2$ and Mn includes the components $UO_2$ and Mn and any other components that do not affect the properties or functions of the $UO_2$ or Mn components, or the processes or functions of the fuel and/or fuel rod. For example, in some embodiments, a fuel and/or fuel rod that "consists essentially of" $UO_2$ and Mn includes the components $UO_2$ and Mn, but does not include other dopant materials, such as Cr and/or Al. The Mn is included as a dopant up to the solubility limit of the Mn compound in $UO_2$, for example, in substantially the same amounts as described above.

In some embodiments, the Mn is derived from a manganese salt having one or more counter anions. The one or more counter anions are not particularly limited, and may each be, for example, an oxide anion, a nitride anion, a stearate anion, a chloride anion, a hydroxide anion, or a combination thereof.

In some embodiments, the Mn is derived from a manganese oxide. The manganese oxide is also not particularly limited, and may include, for example, MnO, $Mn_3O_4$, $Mn_2O_3$, $MnO_2$, $MnO_3$, and $Mn_2O_7$, or a combination thereof. In some embodiments, the manganese oxide is $Mn_2O_3$. The form of $Mn_2O_3$ is not particularly limited, and may be provided as birnessite, hausmannite, manganite, manganosite, psilomelane, and pyrolusite.

In some embodiments, when the Mn includes $Mn_2O_3$, the $Mn_2O_3$ may be added in an amount of at least about 0.29 wt % (2880 ppm) $Mn_2O_3$ in $UO_2$, for example, about 0.29 wt % to about 2.9 wt % $Mn_2O_3$ in $UO_2$ or about 0.29 wt % to about 1.5 wt % $Mn_2O_3$ in $UO_2$.

In some embodiments, the Mn is included in an amount of about 0.01 wt % to about 0.1 wt % (about 100 ppm to about 1000 ppm), for example, about 0.05 wt % to about 0.1 wt % (about 500 ppm to about 1000 ppm), or about 0.075 wt % to about 0.1 wt % (about 750 ppm to about 1000 ppm), referring to the weight of the Mn atom with respect to the total weight of the fuel or fuel pellet.

In some embodiments, the Mn has an interstitial concentration of larger than about 0.001 fractional defects, for example, about 0.001 to about 0.5 fractional defects per unit of $UO_2$ at a sintering temperature above about 1430 K, for example, at about 1600 K to about 3200 K, or about 1680 K to about 2000 K. In some embodiments, the Mn has an interstitial concentration of about 0.01 to about 0.5 fractional defects per unit of $UO_2$ at a sintering temperature above about 1700 K, for example, at about 1750 K to about 3200 K, or about 1780 K to about 2000 K. In the present model, this corresponds to a uranium vacancy concentration of larger than about $2.6 \times 10^{-7}$ at a temperature above about 1430 K, for example, about $4.0 \times 10^{-9}$ to about $4.4 \times 10^{-8}$ uranium vacancies per unit of $UO_2$ between 1700 K to about 2000 K. In some embodiments, the Mn has an interstitial concentration of about 0.01 to about 0.1 fractional defects per unit of $UO_2$ at a sintering temperature above about 1700 K, for example, about 1750 K to about 1950 K. In the present model, this corresponds to a uranium vacancy concentration of about $4.0 \times 10^{-9}$ to about $1.6 \times 10^{-8}$ per unit of $UO_2$. In some embodiments, the Mn has an interstitial concentration of about $10^{-4}$ to about $10^{-2}$ fractional defects per unit of $UO_2$ at a sintering temperature of about 1600 K to about 1800 K, corresponding to a uranium vacancy concentration of about $2.4 \times 10^{-9}$ to about $1.4 \times 10^{-8}$ per unit of $UO_2$. In some embodiments, the Mn has an interstitial concentration of about $10^{-5}$ to about $10^{-4}$ fractional defects per unit of $UO_2$ at a sintering temperature of about 1520 K to about 1600 K, corresponding to a uranium vacancy concentration of about $1.0 \times 10^{-8}$ to about $5 \times 10^{-8}$ per unit of $UO_2$.

In some embodiments, the nuclear fuel or pellet has a grain size enhancement factor over undoped $UO_2$ of, for example, about 1.1 to about 35 times after sintering at about 1700 K to about 3200 K. In some embodiments, the nuclear fuel or pellet has a grain size enhancement factor over undoped $UO_2$ of, for example, about 1.3 to about 14 times after sintering at about 1770 K to about 2000 K. In some embodiments, the nuclear fuel or pellet has a grain size enhancement factor over undoped $UO_2$ of, for example, about 1.1 to about 1.3 times after sintering at about 1700 K to about 1770 K.

In some embodiments, the nuclear fuel or pellet has a grain size of about 15 μm to about 200 μm, for example, about 50 μm to about 180 μm after sintering at about 1770 K to about 3200 K. In some embodiments, the nuclear fuel or pellet has a grain size of about 15 μm to about 100 μm, for example, about 50 μm to about 100 μm after sintering at about 1770 K to about 2000 K. In some embodiments, the nuclear fuel or pellet has a grain size of about 10 μm to about 50 μm, for example, about 12 μm to about 15 μm after sintering at about 1720 K to about 1770 K.

In some embodiments, the nuclear fuel or pellet may further include active nuclides (actinides) other than uranium. For example, the nuclear fuel or pellet may include thorium (Th) and/or plutonium (Pu). The concentration (amount) of such nuclides (actinides) is not particularly limited. In some embodiments, for example, the concentration of Th and/or Pu may be up to about x=0.95 in the $U_{1-x}(Th,Pu)_xO_2$ system.

According to one or more embodiments of the present disclosure, a method of manufacturing a nuclear fuel pellet includes: mixing uranium(IV) oxide ($UO_2$) and a manganese (Mn) dopant (e.g., Mn source) in the absence of added aluminum (Al) to yield a fuel composition that is substantially free of aluminum; pressing the fuel composition into a pellet; and sintering the pellet.

The $UO_2$ and the Mn dopant (e.g., Mn source) are mixed and pressed into slugs or pellets in order to increase the interfacial surface area between the two reactants, thereby increasing their rate of solid-state diffusion, as well as the overall reaction rate. The Mn dopant may be the same as described herein in connection with the nuclear fuel according to embodiments of the present disclosure. The process of mixing is not particularly limited, and may be similar to processes available in the related art.

In some embodiments, one or more active nuclides (actinides) other than uranium may be further mixed with the $UO_2$ and the Mn dopant (e.g., Mn source). The one or more active nuclides (actinides) may be the same as described herein.

In some embodiments, the mixing may be carried out by co-milling. The co-milling may be achieved using any suitable method, such as ball-milling, wet milling, jet milling, roller milling, cutter milling, etc. In some embodiments, the average particle size of the Mn source and the $UO_2$ after milling may be less than about 500 μm. For example, the average particle size may be less than about 100 μm, less than about 1 μm, or less than about 100 nm.

The process of pressing the fuel composition into a pellet is not particularly limited, and may be similar to processes available in the related art. The size and shape of the pellet after pressing is not particularly limited. For example, the pellet may have an average outer diameter (OD) of about 1 mm to about 5 cm (50 mm), or about 10 mm to about 40 mm. The pellet may have an average length of about 1 mm to about 2 cm (20 mm), or about 5 mm to about 10 mm. The pressing may be achieved using any suitable method or device, and a person of ordinary skill in the art is capable of selecting a method, density, and pressure according to the desired physical characteristics of the pellets.

In some embodiments, the nuclear fuel pellet may be sintered at a temperature suitable for dissolving the Mn dopant in the $UO_2$. The fuel composition does not include Al, and therefore does not form an Mn—Al eutectic. In some embodiments, the nuclear fuel pellet may be sintered at about 1430 K to about 3200 K, about 1700 K to about 3200 K, or about 1700 K to about 2000 K. In some embodiments, for example when the nuclear fuel pellet contains higher amounts of Mn (e.g., about 0.1 wt % to about 1 wt %, or about 0.5 wt % to about 1 wt %) and is sintered at higher temperatures (e.g., above about 1840 K, for example about 1840 K to about 3200 K, or 1840 K to 2000 K), an Mn—O liquid phase may be formed; however, this is not expected to undermine the sintering and grain size enhancement of the fuel by grain boundary pinning. Instead, it may further enhance grain growth. In some embodiments, for example when the nuclear fuel pellet is sintered at less than about 1840 K, the fuel composition does not form a liquid phase. In some embodiments, for example, the nuclear fuel pellet may be sintered at a temperature of about 1430 K to about 1800 K, about 1430 K to about 1700 K, about 1500 K to about 1750 K, or about 1600 K to 1700 K.

The following example calculations and data are provided for illustrative purposes only, and do not limit the scope of the embodiments of the present disclosure.

DFT studies of doped and undoped $UO_2$ were conducted to study the dopant-dependent behaviors and concentrations of various defects (structural variations from the ideal unit cell) in these materials. The calculation methods are described in more detail in Cooper, M. W. D., Stanek, C. R., and Andersson, D. A., "The role of dopant charge state on defect chemistry and grain growth of doped $UO_2$", *Acta Mater.*, 2018, 150, 403-413, the entire content of which is incorporated herein by reference.

Figure 3:
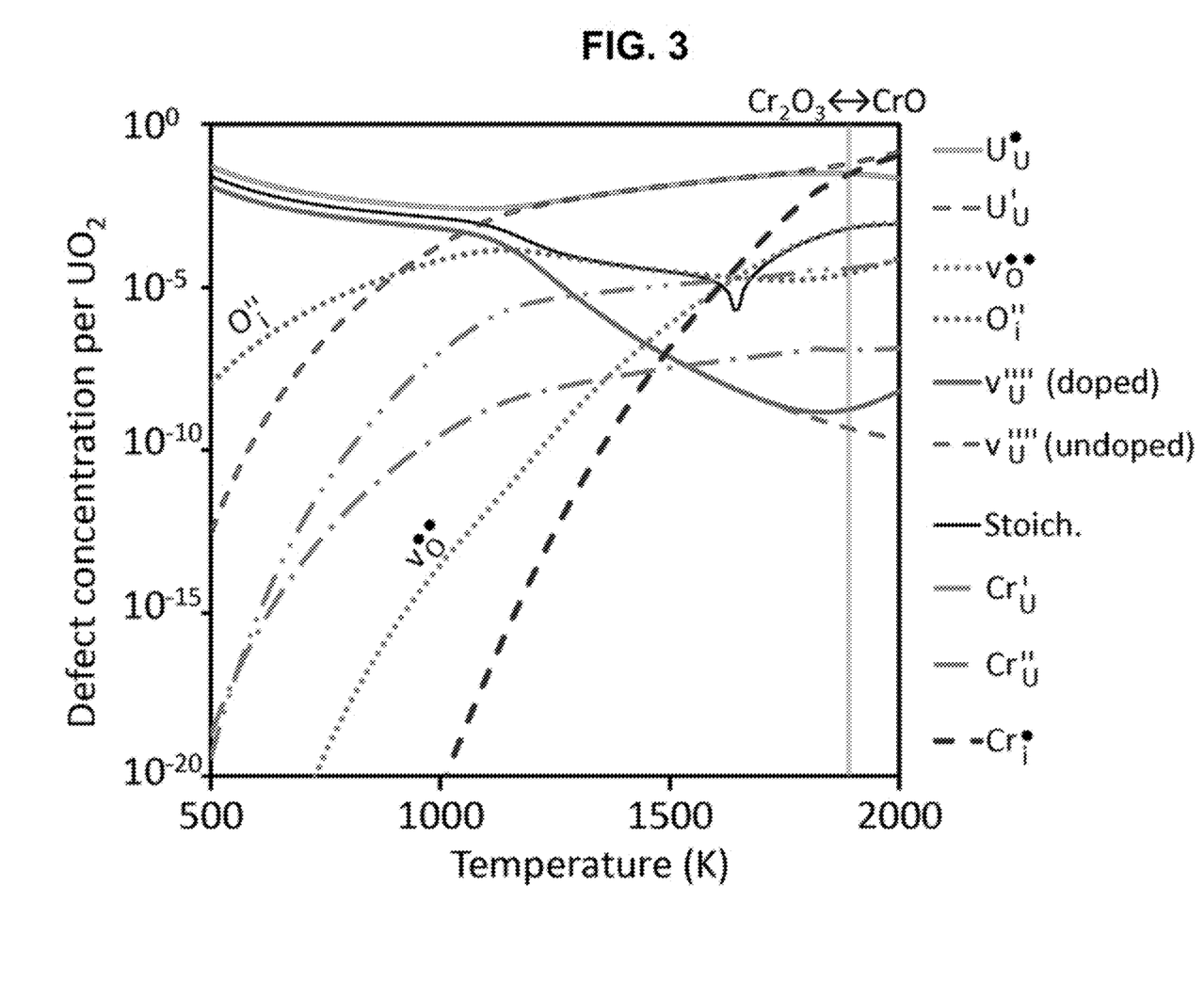
FIG. 3 is a plot showing the calculated concentrations (y-axis, in log units) of various defect species in Cr-doped $UO_2$ with respect to temperature (x-axis, in K).
Figure 4:
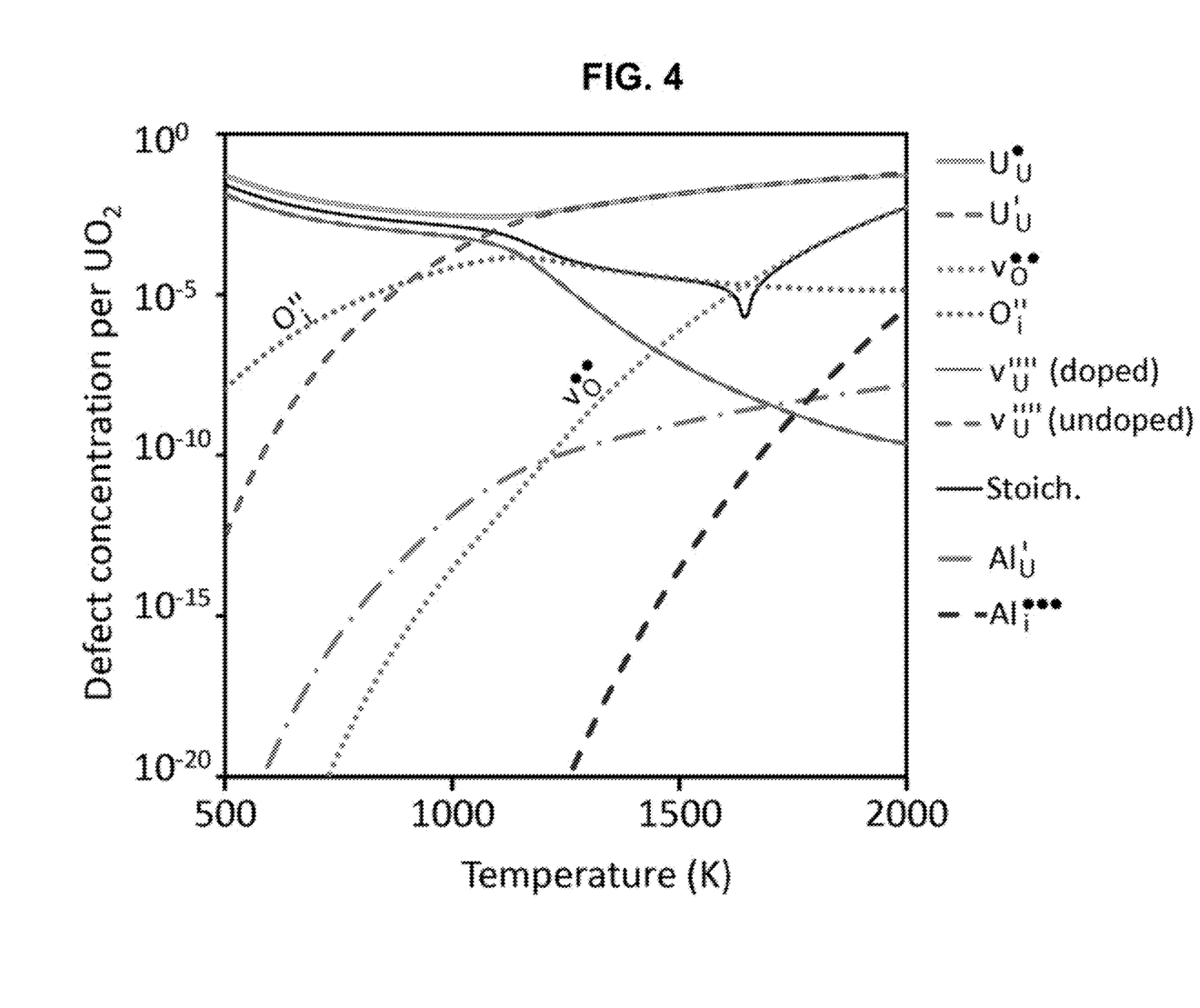
FIG. 4 is a plot showing the calculated concentrations (y-axis, in log units) of various defect species in Al-doped $UO_2$ with respect to temperature (x-axis, in K).
Figure 5:
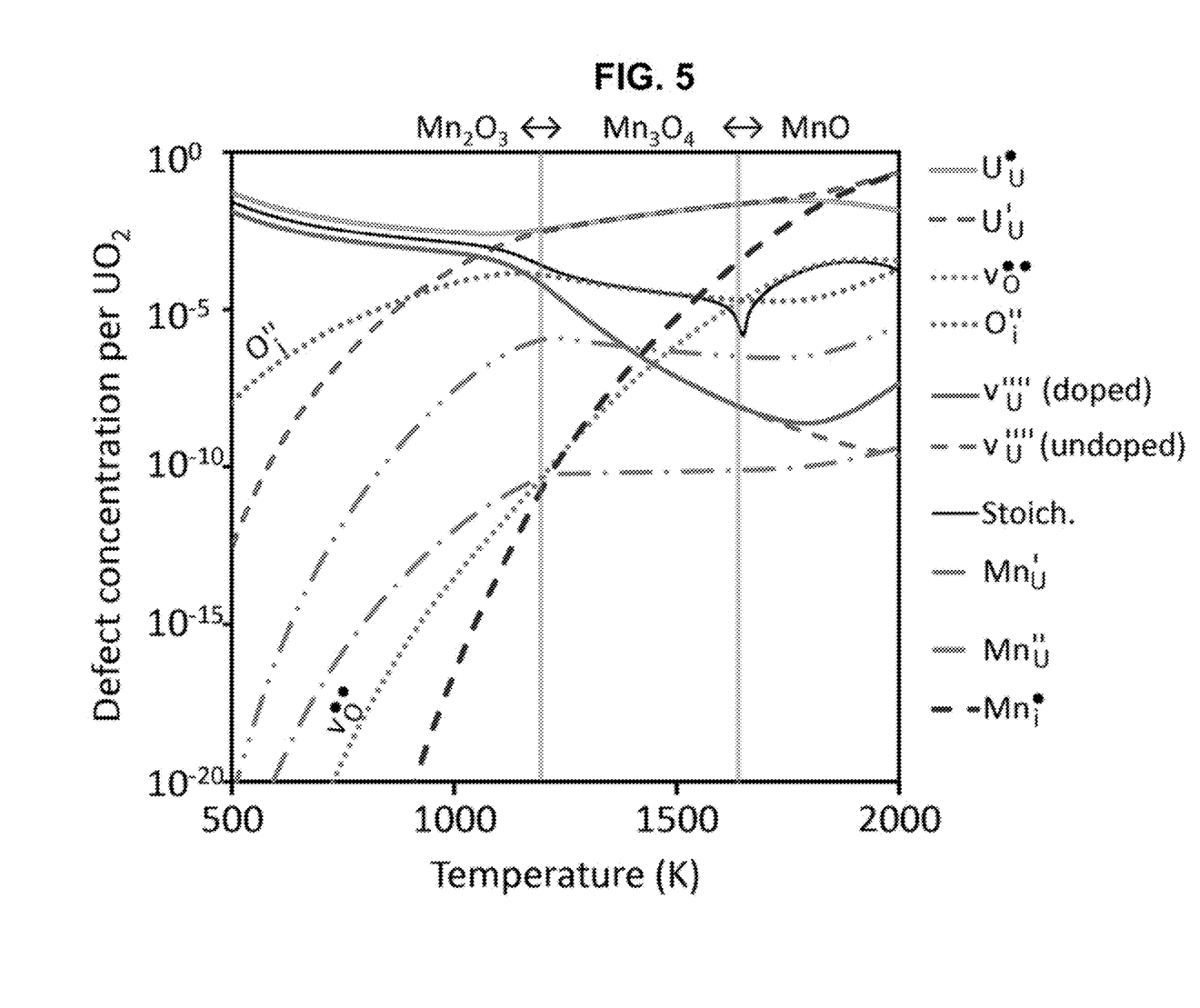
FIG. 5 is a plot showing the calculated concentrations (y-axis, in log units) of various defect species in Mn-doped $UO_2$ with respect to temperature (x-axis, in K).

FIGS. 3, 4, and 5 are plots showing the calculated concentrations (y-axis, in log units) of various defect species in $UO_2$ doped with a Cr, Al, or Mn atom, respectively, with respect to the externally applied temperature (x-axis, in K).

The species in FIGS. 3 to 5 are identified using Kröger-Vink notation, in which v refers to an atomic vacancy at a normally occupied position, and element symbols refer to an atom of that element at a normally unoccupied position, or at a position normally occupied by another element. The subscript $_U$ indicates that the defect is at a uranium(IV) sub-lattice position, while the subscript $_i$ indicates that the dopant atom is in an interstitial position. The superscripts • and ' refer to +ve and -ve dopant charges, respectively, with multiple superscripts indicating proportionately higher charge magnitudes.

For example, in FIGS. 3 to 5, the term U'$_U$ (hollow solid trace) refers to a U(V) defect at a U(IV) lattice site, and the term U'$_U$ (hollow dashed trace) refers to a U(III) defect at a U(IV) lattice site. v''$_O$ (dotted trace, labeled) refers to a vacancy at an O(-II) lattice site, and O''$_i$ (dotted trace, labeled) refers to an oxygen atom at a normally unoccupied (neutral) interstitial site. V$_U$'''' (partially overlapping solid and dashed traces) refers to the population of vacancies on the U(IV) lattice site, where V$_U$ (doped) (solid trace) is the population after doping, and V$_U$ (undoped) (dashed trace) is included as a baseline reference for comparison to the doped UO$_2$ examples.

The thin solid trace is of x in the formula UO$_{2\pm x}$, and follows the temperature-dependent compositional shift from hyperstoichimetric (relatively oxidized) UO$_{2+x}$ at low temperatures to reduced UO$_{2-x}$ at higher temperatures. The minimum at about 1700 K corresponds to the transition borderline, and is consistent with the calculated decrease in interstitial oxygen and increase in oxygen vacancies at that temperature, as seen as the crossover point of v''$_O$ and O''$_i$ in all examples.

FIG. 3 is a plot comparing defect concentrations in Cr-doped UO$_2$ and undoped UO$_2$. FIG. 3 shows that the calculated concentrations of U'$_U$ (U(III)), v''$_O$ (oxygen vacancies), and solubilized Cr atoms (as interstitial Cr$_i^•$ (heavy dashed trace) and as substitutional CR$_U$ (dash-dotted trace) and Cr''$_U$ (dash-double dotted trace)) generally increase with higher temperatures. Meanwhile, the calculated concentrations of U'$_U$ (U(V)) and interstitial O defects O''i appear to be relatively temperature-independent. The calculated concentration of uranium vacancies v''''$_U$ appears to generally decrease as the temperature is increased above about 500 K. It should be noted that even though the concentration of intrinsic uranium vacancies is relatively high at the lower end of this temperature range, diffusion of atoms through the crystal lattice is nevertheless expected to be slow at these temperatures, as predicted by the $e^{-1/T}$ dependence of diffusion rates. As such, any stated uranium vacancy concentration should be considered in the context of a given temperature and in comparison with undoped UO$_2$.

Below about 1620 K, the concentration of Cr is predicted to be much higher at the uranium substitutional position (Cr'$_U$ and Cr''$_U$) than at the interstitial position (C$_i^•$). At temperatures above 1620 K, the relative concentrations are switched, which suggests that there is a thermally induced transfer of Cr atoms from uranium sites to interstitial sites, along with reduction of the Cr species to Cr(I). The most stable form of Cr oxide over the calculated temperature range is shown at the top of the plot for comparison and reference (e.g., Cr$_2$O$_3$ below about 1900 K, and CrO above about 1900 K). The uranium vacancy concentration for Cr-doped UO$_2$ (v''''$_U$ (doped)) increases by several orders of magnitude relative to the undoped UO$_2$ reference (v''''$_U$ (undoped)) at temperatures above about 1750 K. As such, FIG. 3 shows that the increase in soluble Cr species, especially the interstitial Cr concentration, is correlated with an increase in uranium vacancies v''''$_U$ relative to undoped UO$_2$. Furthermore, the model predicts Cr solubility limits in reasonable agreement with available experimental data.

FIG. 4 is a plot comparing defect concentrations in Al-doped UO$_2$ and undoped UO$_2$. FIG. 4 shows that the calculated concentrations of U'$_U$ (U(III)), v''$_O$ (oxygen vacancies), and solubilized Al atoms (as interstitial Al'''$_i$ (heavy dashed trace) and substitutional Al'$_U$ (dash-dotted trace)) increase with higher temperatures. However, a higher temperature of about 1770 K or greater is necessary to induce preferential occupation of interstitial sites, compared to 1620 K for Cr in FIG. 3. Furthermore, the concentration of solubilized Al atoms is much smaller than Cr atoms by a factor of about 10$^3$ to 10$^4$ for both sites. Most notably, the concentration of uranium vacancies is not predicted to increase above that predicted for undoped UO$_2$, suggesting that the low Al solubility results in Al having a negligible effect on uranium vacancies in UO$_2$.

FIG. 5 is a plot comparing defect concentrations in Mn-doped UO$_2$ and undoped UO$_2$. FIG. 5 shows that similarly to Al-doped and Cr-doped UO$_2$, the calculated concentrations of U'$_U$ (U(III)), v''$_O$ (oxygen vacancies), and solubilized Mn atoms (as interstitial Mn$_i^•$ (heavy dashed trace) and substitutional Mn'$_U$ (dash-dotted trace) and Mn''$_U$ (dash-double dotted trace)) increase with higher temperatures. However, preferential occupation of interstitial sites (as shown by the crossover of Mn$_i^•$ and Mn''$_U$) occurs at a much lower temperature of about 1430 K. Furthermore, the concentration of solubilized Mn$_i^•$ atoms is larger than the concentrations of Cr$_i^•$ and Al$_i^•$ atoms at every temperature in their respective calculations. Again, the most stable form of Mn oxide over the calculated temperature range is shown at the top of the plot for comparison and reference (e.g., Mn$_2$O$_3$ below about 1250 K, Mn$_3$O$_4$ between about 1250 K to about 1600 K, and MnO above about 1600 K).

Figure 6:
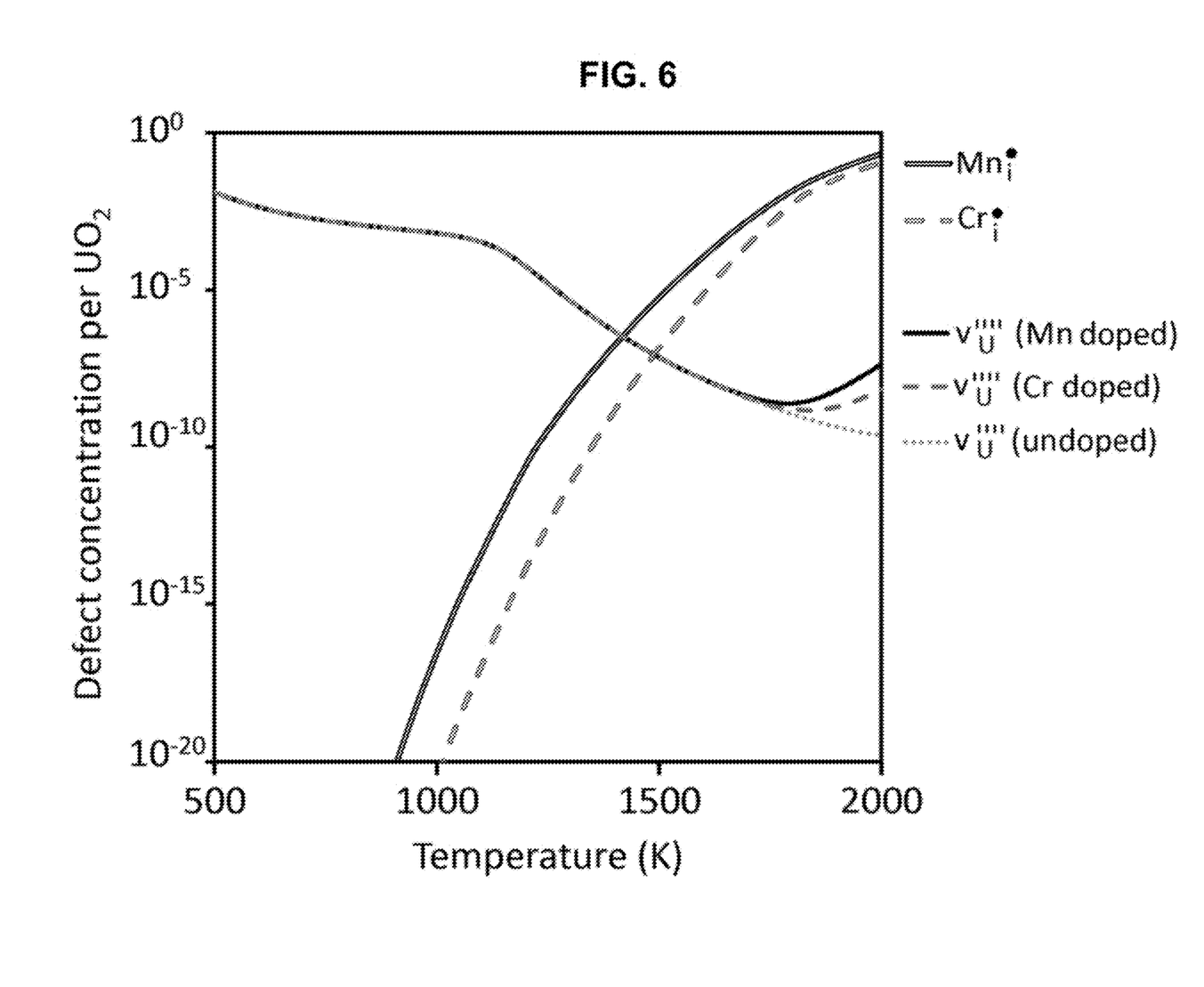
FIG. 6 is a plot directly comparing the total interstitial concentrations of Mn and Cr in Mn-doped $UO_2$ (hollow trace) and Cr-doped $UO_2$ (hollow dashed trace), respectively, as well as the concentrations of $v''''_U$ in Mn-doped $UO_2$ (solid trace), Cr-doped $UO_2$ (solid dashed trace), and undoped $UO_2$ (dotted trace).

FIG. 6 is a plot directly comparing the total interstitial concentrations of Mn and Cr in Mn-doped UO$_2$ (hollow trace) and Cr-doped UO$_2$ (hollow dashed trace), respectively, as well as the concentrations of v''''$_U$ in Mn-doped UO$_2$ (solid trace), Cr-doped UO$_2$ (dashed trace), and undoped UO$_2$ (dotted trace). FIG. 6 reiterates that the solubility of Mn is generally greater than that of Cr, and that the interstitial concentration of Mn is greater than that of Cr at all temperatures. In addition, the interstitial site is preferred over the uranium substitutional site at a lower temperature for Mn than for Cr. For example, the crossover point for the interstitial and substitutional defect species is about 70 K lower for Mn than for Cr. The calculated concentration of uranium vacancies V$_U$ is higher for Mn than for Cr and undoped UO$_2$ at temperatures above about 1700 K, which again shows that an increase in interstitial doping is correlated with an increase in uranium vacancies relative to undoped UO$_2$, and that Mn is more effective than Cr at increasing the concentration of uranium vacancies v''''$_U$.

The temperature-dependent equilibrium between interstitial and uranium site doping was modeled in order to explore dopant atom positioning at temperatures relevant to reactor operating conditions (lower than sintering temperatures). In particular, the calculated concentrations in FIGS. 3 to 6 suggest the dopant atoms solubilized at interstitial positions at higher temperatures may preferentially move to uranium sub-lattice positions and thereby act as −ve substitutional defects at lower temperatures. For example, if an interstitial Mn$_i^•$+1e defect atom were to hop to a nearby uranium vacancy, it would then become a Mn'''$_U$ –3e defect according to the equilibrium represented by Example Equation 1:
Example Equation 1

$$Mn'''_U \overset{K_{eq}}{\leftrightarrow} Mn^{\bullet}_i + V''''_U$$

Example Equation 1 is endothermic as written, so that lower temperatures shift the equilibrium toward the left and higher temperatures shift the equilibrium toward the right. It will be understood that the temperature-dependent phase equilibrium described in Example Equation 1 does not limit or fully describe the equilibrium between defect species in these calculated UO$_2$ examples. For example, an array of additional redox equilibrium equations between species with varying valence charges, and positional equilibrium equations for each of those redox species may be operative in the material. Further, the equilibrium may also be affected by the temperature-dependent solubility of the species (e.g., as described by the K$_{sp}$ of the dopant source material).

As discussed above in connection with the +ve and –ve modeling studies, inclusion of a –ve substitutional defect is predicted to decrease the concentration of uranium vacancies. Indeed, this can be seen in FIGS. 3 and 5 between about 1000 K to about 1500 K, where Mn''$_U$ and Cr''$_U$ are the respective dominant Mn and Cr species, respectively, and v''''$_U$ undergoes a rapid decrease. The equilibrium represented by Example Equation 1 may therefore serve to suppress or decrease the uranium vacancy concentrations at middle temperatures (e.g., under reactor operating temperatures, for example 1000 K to 1500 K), after sintering is complete. The decrease in [V$_U$] within this temperature range (e.g., 1000 K to 1500 K) may help to further suppress fission gas release by blocking diffusion pathways for gas atoms on the uranium sub-lattice.

Figure 7:
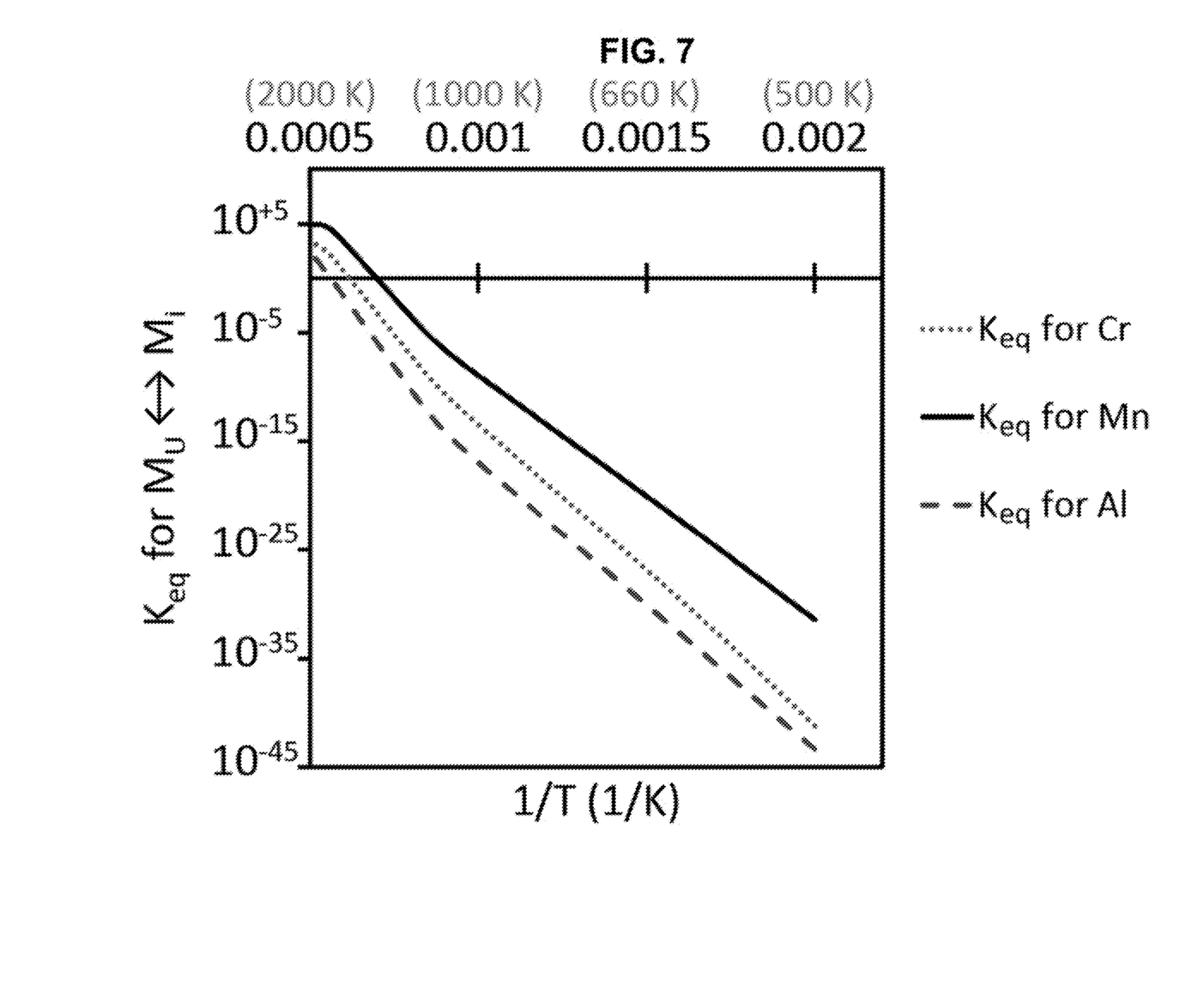
FIG. 7 is a Van't Hoff plot relating the equilibrium constant $K_{eq}$ for the equilibrium between interstitial and substitutional Mn (solid trace), Cr (dotted trace), and Al (dashed trace) with temperature (1/T, as shown on the x-axis).

FIG. 7 is a Van't Hoff plot relating the calculated equilibrium constant K$_{eq}$ for the Equation 1 equilibrium between interstitial and substitutional positioning of Mn (solid trace), Cr (dotted trace), and Al (dashed trace) with temperature (1/T, as shown on the x-axis). Here, K$_{eq}$ is calculated using the total concentration of all interstitial Cr (or Mn or Al) species (e.g., the total amount of interstitial Cr having any valence), and likewise all substitutional Cr (or Mn or Al) species. In general, FIG. 7 shows that K$_{eq}$ favoring the interstitial species M$_i$ increases with increasing temperature (moving left on the x-axis), consistent with the equilibrium being endothermic with respect to shifting of the dopant atom to an interstitial site. K$_{eq}$ is less than 1 at temperatures lower than about 1470 K, again demonstrating that interstitial doping is thermodynamically preferred at higher (sintering) temperatures but is converted to substitutional doping at lower (ambient and reactor) temperatures.

The traces in FIG. 7 were fit by Arrhenius functions in three distinct (linear) temperature regimes, starting with the Cr trace as a baseline. Each temperature regime corresponds to a different state having a particular dominant charge compensating mechanism (e.g., dominant defect species). When Cr is a dopant, v''''$_U$ and U'$_U$ dominate below about 1080 K, U'$_U$ and U'$_U$ dominate between about 1780 K to about 1080 K, and Cr; and U'$_U$ dominate above 1780 K. A similar analysis was carried out for Al and Mn within the same temperature regimes, and the fitting results are summarized in Table 1. A and B correspond to the Arrhenius function variables $$\left(A \exp\frac{-B}{k_bT}\right),$$

where k$_b$ is the Boltzmann constant and T is the temperature. In Table 1, the low and intermediate regimes are selected independently of the dopant so that the transition occurs at the same temperature (1080 K), but the transition from the intermediate to the high temperature regime is selected to be the temperature at which [v''''$_U$] enhancement occurs for a given dopant. The high temperature regime for Al is not reported because it does not exist (e.g., Al'''$_i$ is never a dominant defect). Table 1 shows that the Mn dopant reaches [v''''$_U$] enhancement at a lower temperature (1700 K) than Cr (1780 K), again demonstrating that Mn is more soluble and has a larger effect on v''''$_U$ than Cr.

TABLE 1

| Dopant (Temperature range) | A (unitless) | | | B (eV) |
|---|---|---|---|---|
| Cr (600 K-1080 K) | 3.049 | × | 10$^{11}$ | 4.993 |
| Cr (1080 K-1780 K) | 1.425 | × | 10$^{24}$ | 7.754 |
| Cr (1780 K-2000 K) | 3.362 | × | 10$^8$ | 2.094 |
| Al (600 K-1080 K) | 1.305 | × | 10$^9$ | 5.188 |
| Al (1080 K-2000 K) | 9.000 | × | 10$^{22}$ | 8.255 |
| Mn (600 K-1080 K) | 1.144 | × | 10$^{13}$ | 4.993 |
| Mn (1080 K-1700 K) | 1.477 | × | 10$^{24}$ | 6.866 |
| Mn (1700 K-2000 K) | 1.943 | × | 10$^8$ | 1.268 |

As described herein, example embodiments of the present disclosure may enable production of uranium oxide based fuels having larger grain sizes after sintering, and hence, lower rates of fission gas release. In addition, the methods according to embodiments of the present disclosure, as described herein, may be compatible with state of the art fuel processing methods and plants.

The use of interstitially doped Mn by itself appears to be more effective than Cr and Al at increasing the grain size of UO$_2$, as well as at achieving such grain size increases at lower temperatures. As such, embodiments of the present invention may provide enhanced sintering benefits at lower temperatures, thereby saving energy and money.

The reduction in fission gas release enables embodiments of the present invention to be used with higher burnups or in longer fuel cycles, achieving greater economic returns per ton of uranium fuel. An additional benefit of embodiments of the present invention is that the increased plasticity of the pellet can reduce stress buildup at the pellet-clad interface and further contribute to reductions in fuel rod failure.

Furthermore, embodiments of the present invention may tackle the issue of fission gas release in an incremental manner that would make proof-of-safety for introduction to the nuclear fuel cycle relatively easy. Embodiments of the present invention could be readily introduced into nuclear fuel cycles where undoped and Cr-doped UO$_2$ are already widely used.

The cost of Mn is approximately the same as Cr (~$2 per kg in January 2017). The business model for Mn-doped UO$_2$ will thus be very similar to that of Cr-doped UO$_2$. However, the benefits described herein will be greater in Mn-doped UO$_2$ as a consequence of its higher solubility at the interstitial site, giving rise to higher uranium vacancy concentrations (2-10 times higher than for Cr) and thus producing larger grains during sintering.

While certain exemplary embodiments of the present disclosure have been illustrated and described, those of ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "a" dopant, "an" oxide, and the like, one or more of these components in any combination can be used according to the present disclosure.

Also, although certain embodiments have been described as "comprising" or "including" the specified components, embodiments "consisting essentially of" or "consisting of" the listed components are also within the scope of this disclosure. For example, while embodiments of the present invention are described as comprising mixing uranium(IV) oxide ($UO_2$) and a manganese (Mn) source in the absence of added aluminum (Al) to yield a fuel composition; pressing the fuel composition into a pellet; and sintering the pellet, embodiments consisting essentially of or consisting of these actions are also within the scope of this disclosure. Accordingly, a method of manufacturing a nuclear fuel pellet may consist essentially of: mixing uranium(IV) oxide ($UO_2$) and a manganese (Mn) source in the absence of aluminum (Al) to yield a fuel composition; pressing the fuel composition into a pellet; and sintering the pellet. In this context, "consisting essentially of" means that any additional components or process actions will not materially affect the properties or performance of the product produced by the method.

As used herein, unless otherwise expressly specified, all numbers such as those expressing values, ranges, amounts or percentages may be read as if prefaced by the word "about", even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "a" dopant or "an" oxide, a mixture of such dopants or oxides can be used. When ranges are given, any endpoints of those ranges and/or numbers within those ranges can be combined within the scope of the present disclosure. The terms "including" and like terms mean "including but not limited to," unless specified to the contrary. Further, as used herein, the term "substantially" is used as a term of approximation and not as a term of degree, and is intended to account for normal variations and deviations in the measurement or assessment of various parameters of the complexes and compositions (e.g., in the description of physical or chemical properties of various components and in the description of amounts of various components).

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements and/or computational methods. The word "comprising" and variations thereof as used in this description and in the claims do not limit the disclosure to exclude any variants or additions.

What is claimed is:

1. A nuclear fuel pellet comprising uranium(IV) oxide ($UO_2$) and manganese (Mn) atoms, the Mn atoms being present in the nuclear fuel pellet in an amount of about 0.1 wt % to about 1 wt % based on the total weight of the nuclear fuel pellet; and
    the nuclear fuel pellet being substantially free of aluminum (Al).

2. The nuclear fuel pellet of claim 1, wherein the Mn atoms are derived from a manganese salt having one or more counter anions, the one or more counter anions each comprising an oxide anion, a nitride anion, a stearate anion, a chloride anion, or a hydroxide anion.

3. The nuclear fuel pellet of claim 2, wherein the Mn atoms are derived from a manganese oxide.

4. The nuclear fuel pellet of claim 3, wherein the manganese oxide is $Mn_2O_3$.

5. The nuclear fuel pellet of claim 1, wherein the Mn atoms are present in the nuclear fuel pellet in an amount of about 0.1 wt % to about 0.5 wt % based on the total weight of the nuclear fuel pellet.

6. The nuclear fuel pellet of claim 1, wherein the Mn atoms have an interstitial concentration of about 0.001 to about 0.5 fractional defects per unit of $UO_2$ at a sintering temperature above about 1430 K.

7. The nuclear fuel pellet of claim 6, wherein the Mn atoms have an interstitial concentration of about 0.01 to about 0.1 fractional defects per unit of $UO_2$ at a sintering temperature above about 1700 K.

8. The nuclear fuel pellet of claim 1, wherein the nuclear fuel pellet has a grain size enhancement factor over undoped $UO_2$ of about 1.1 to about 35 times after sintering at about 1700 K to about 3200 K.

9. The nuclear fuel pellet of claim 8, wherein the nuclear fuel pellet has a grain size enhancement factor over undoped $UO_2$ of about 1.3 to about 14 times after sintering at about 1700 K to about 2000 K.

10. The nuclear fuel pellet of claim 1, wherein the nuclear fuel pellet further comprises active nuclides other than uranium.

11. The nuclear fuel pellet of claim 10, wherein the active nuclides other than uranium comprise thorium (Th), plutonium (Pu), or a mixture thereof.

12. A method of manufacturing a nuclear fuel pellet comprising:
    mixing uranium(IV) oxide ($UO_2$) and a manganese (Mn) dopant in the absence of added aluminum (Al) to yield a fuel composition that is substantially free of aluminum;
    pressing the fuel composition into a pellet; and
    sintering the pellet, the resulting pellet having a Mn atom concentration of about 0.1 wt % to about 1 wt % based on the total weight of the fuel composition.

13. The method of claim 12, wherein the Mn dopant is derived from a manganese salt having one or more counter anions, the one or more counter anions each comprising an oxide anion, a nitride anion, a stearate anion, a chloride anion, or a hydroxide anion.

14. The method of claim 13, wherein the Mn dopant is derived from a manganese oxide.

15. The method of claim 14, wherein the manganese oxide is $Mn_2O_3$.

16. The method of claim 12, wherein the sintering the pellet is carried out at a temperature of about 1430 K to about 3200 K.

17. The method of claim 16, wherein the sintering the pellet is carried out at a temperature of about 1700 K to about 2000 K.

18. The method of claim 13, wherein the mixing the $UO_2$ and the manganese (Mn) dopant comprises co-milling the $UO_2$ and the manganese (Mn) dopant to an average particle size of less than 500 μm.

19. The method of claim 12, wherein the sintering the pellet is carried out at a temperature of 1770 K to 3200 K.

20. The method of claim 12, wherein the mixing the $UO_2$ and the manganese (Mn) dopant comprises co-milling the $UO_2$ and the manganese (Mn) dopant to an average particle size of less than 100 μm.

* * * * *